US012412682B2

(12) United States Patent
Yang et al.

(10) Patent No.: US 12,412,682 B2
(45) Date of Patent: Sep. 9, 2025

(54) TAPE WRAPPING DEVICE

(71) Applicants: Tyco Electronics (Shanghai) Co. Ltd., Shanghai (CN); TE Connectivity Services GmbH, Schaffhausen (CH)

(72) Inventors: An (Joshua) Yang, Shanghai (CN); Lvhai (Samuel) Hu, Shanghai (CN); Roberto Francisco-Yi Lu, Bellevue, WA (US); Jian Cao, Shanghai (CN)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 354 days.

(21) Appl. No.: 17/677,334

(22) Filed: Feb. 22, 2022

(65) Prior Publication Data

US 2022/0270788 A1 Aug. 25, 2022

(30) Foreign Application Priority Data

Feb. 22, 2021 (CN) ......................... 202110199196.1

(51) Int. Cl.
*H01B 13/26* (2006.01)
*B65H 16/10* (2006.01)
*B65H 20/02* (2006.01)

(52) U.S. Cl.
CPC ......... *H01B 13/2613* (2013.01); *B65H 16/10* (2013.01); *B65H 20/02* (2013.01); *B65H 2701/1722* (2013.01)

(58) Field of Classification Search
CPC .......... H01B 13/2613; H01B 13/01281; B65H 16/10; B65H 20/02; B65H 37/04
See application file for complete search history.

(56) References Cited

U.S. PATENT DOCUMENTS 5,979,284 A * 11/1999 Granger ............. A47K 10/3643 74/32
9,786,416 B1 * 10/2017 Kerstetter ................ H02G 3/32

FOREIGN PATENT DOCUMENTS

CN 103287930 A * 9/2013
DE 102011079544 A1 * 2/2012 ......... B65H 35/0033
DE 102017202728 A1 * 8/2018

* cited by examiner

*Primary Examiner* — Daniel McNally
(74) *Attorney, Agent, or Firm* — Barley Snyder

(57) ABSTRACT

A tape wrapping device adapted to wind a tape with an adhesive surface and a back surface on a product includes a seat frame, and a tape conveying mechanism installed on the seat frame and adapted to convey the tape to a standby position. The tape conveying system includes a first conveying drum positioned upstream of the standby position along a conveying direction. An outer contour defining an outer peripheral surface of the first conveying drum has a variable outer diameter along an axial direction and is adapted to convey the tape towards the standby position when its outer peripheral surface is in contact with one of the adhesive surface and the back surface of the tape. A binding mechanism is configured to wrap the tape on the product when the product is bonded to the tape at the standby position.

20 Claims, 10 Drawing Sheets

TAPE WRAPPING DEVICE

CROSS-REFERENCE TO RELATED APPLICATIONS

This application claims the benefit of Chinese Patent Application No. CN202110199196.1 filed on Feb. 22, 2021 in the State Intellectual Property Office of China, the whole disclosure of which is incorporated herein by reference.

FIELD OF THE INVENTION

The present disclosure relates to devices for winding a tape on a product and, more specifically, to a tape wrapping device for improving tape delivery.

BACKGROUND

In some applications, in order to facilitate the storage, transportation and management of products, it is usually necessary to wind an adhesive tape on products such as cable bundles. In the prior art, in the process of conveying the tape by the tape wrapping device, the tape is easy to adhere to the components of the tape wrapping device, difficult to separate from the tape wrapping device, and often lead to the blockage of the tape in the tape wrapping device.

Improved systems addressing these deficiencies are desired.

SUMMARY

According to an embodiment of the present disclosure, a tape wrapping device adapted to wind a tape with an adhesive surface and a back surface on a product includes a seat frame, and a tape conveying mechanism installed on the seat frame and adapted to convey the tape to a standby position. The tape conveying system includes a first conveying drum positioned upstream of the standby position along a conveying direction. An outer contour defining an outer peripheral surface of the first conveying drum has a variable outer diameter along an axial direction and is adapted to convey the tape towards the standby position when its outer peripheral surface is in contact with one of the adhesive surface and the back surface of the tape. A binding mechanism is configured to wrap the tape on the product when the product is bonded to the tape at the standby position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
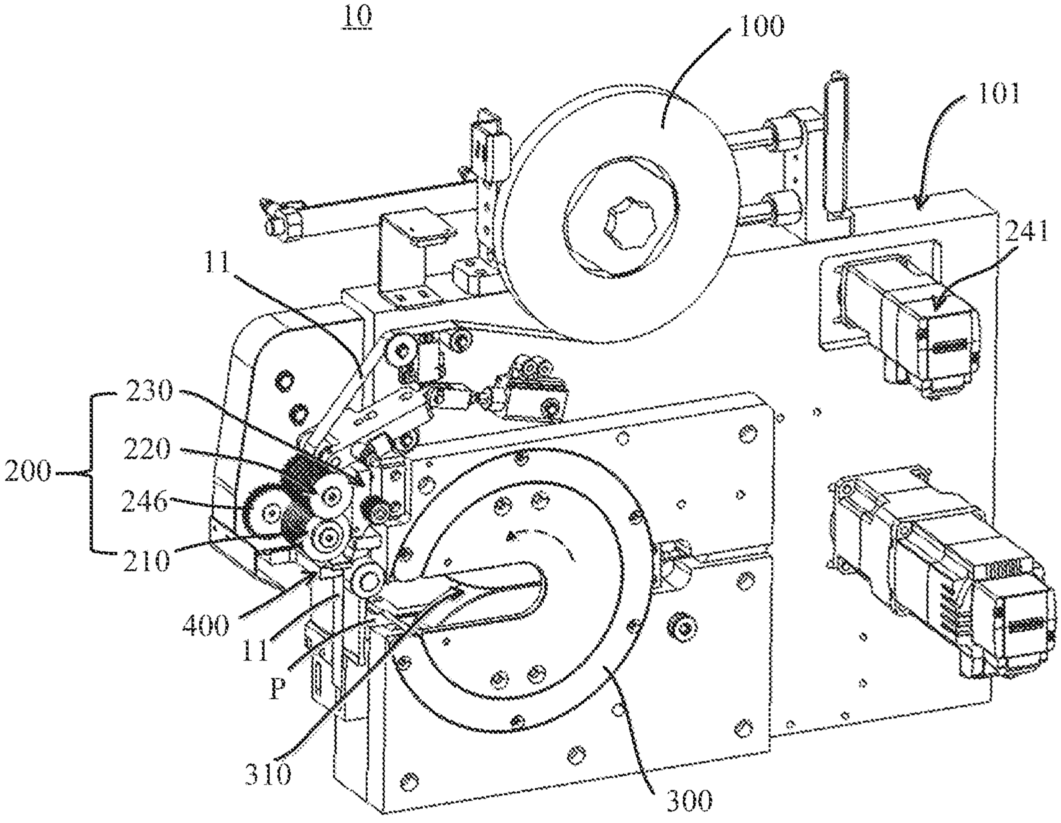
FIG. 1 is a front perspective view schematically showing a configuration of a tape wrapping device according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a tape wrapping device adapted to wind a tape with an adhesive surface and a back surface on a product is provided. The tape wrapping device comprises a seat frame, a tape conveying mechanism installed on the seat frame and adapted to convey the tape to a standby position, and a binding mechanism adapted to wrap the tape on the product when the product is bonded to the tape at the standby position. The tape conveying mechanism comprises a first conveying drum which is positioned upstream of the standby position along the conveying direction of the tape. An outer contour defining an outer peripheral surface of the first conveying drum has a variable outer diameter along an axial direction of the first conveying drum. The first conveying drum is adapted to convey the tape towards the standby position when its outer peripheral surface is in contact with one of the adhesive surface and the back surface of the tape, so that the tape leaving the first conveying drum presents a curved contour in its width direction.

According to an exemplary embodiment of the present disclosure shown in FIG. 1, a tape wrapping device 10 suitable for winding a tape 11 having an adhesive surface and a back surface on a product 1 is shown. There are many types of products to be wound with tape, including but not limited to various cable bundles or cables, such as signal cables, power cables, optical cables, etc. In the illustrated embodiment, tape applied to a power cable is described as an example. For example, in order to facilitate storage, transportation and management, cables such as signal cables, power cables and optical cables are usually coiled, and then the coiled cables are bound together with adhesive tape. In use, the tape is removed from the coiled cable to uncoil the cable.

The tape wrapping device 10 mainly includes a seat frame 101, a tape conveying mechanism 200 and a binding mechanism 300. The base frame 101 may be fixed on a working face or workbench. For example, the base frame 101 may be in the form of a roughly vertical plate, the tape conveying mechanism 200 is installed on the base frame 101 to convey the tape 11 to the standby position P. For example, the tape is conveyed near the binding mechanism 300, the binding mechanism 300 is used to wrap the tape 11 on the product 1 when the product 1 is adhered or bonded with the tape 11 at the standby position.

The tape wrapping device 10 may also be provided with a tape reel 100 wound with tape 11. In some examples, the position of the tape reel 100 may be adjusted to tension the tape 11 leaving the tape reel 100 and conveyed through the tape conveying mechanism 200.

Figure 2:
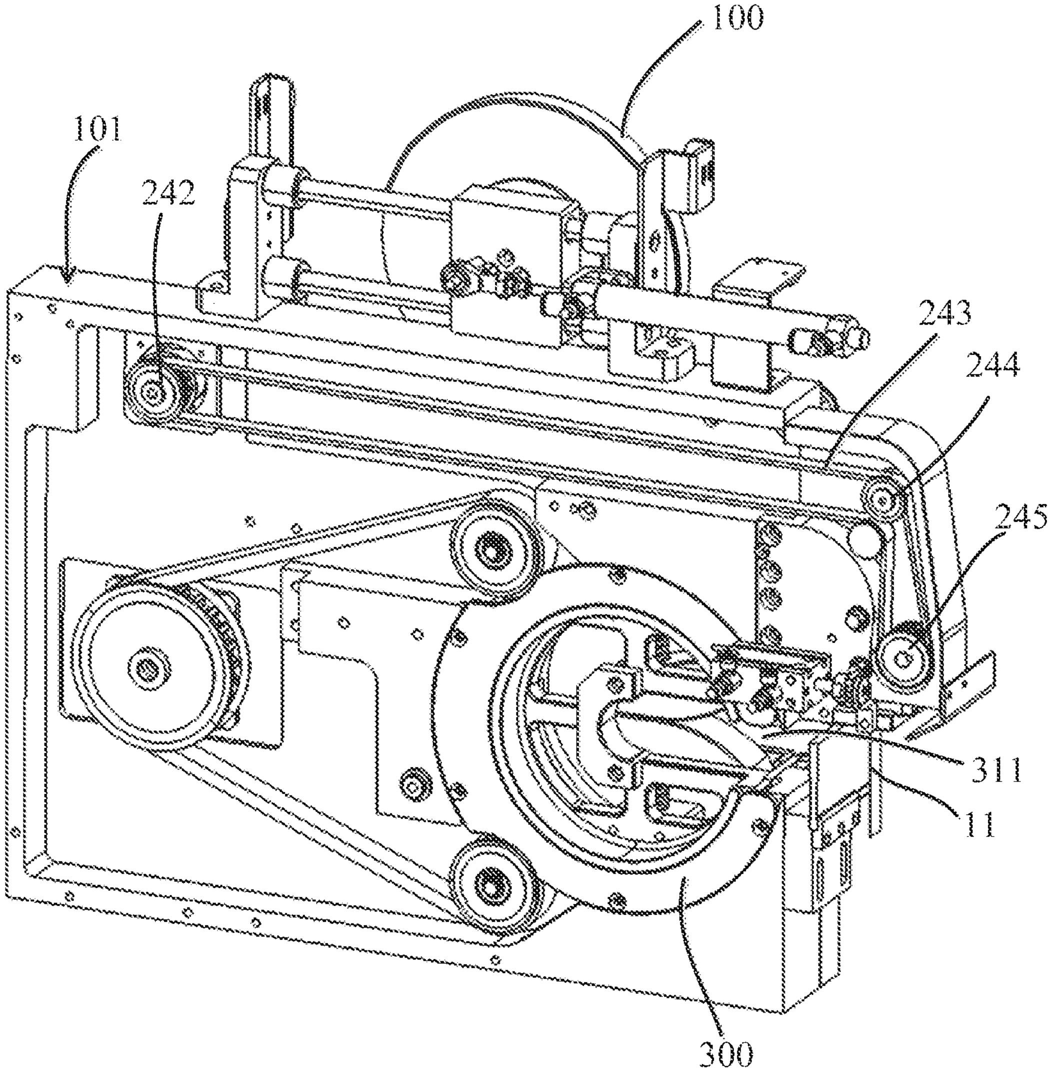
FIG. 2 is a back perspective view schematically showing a configuration of a tape wrapping device according to an exemplary embodiment of the present disclosure.
Figure 3:
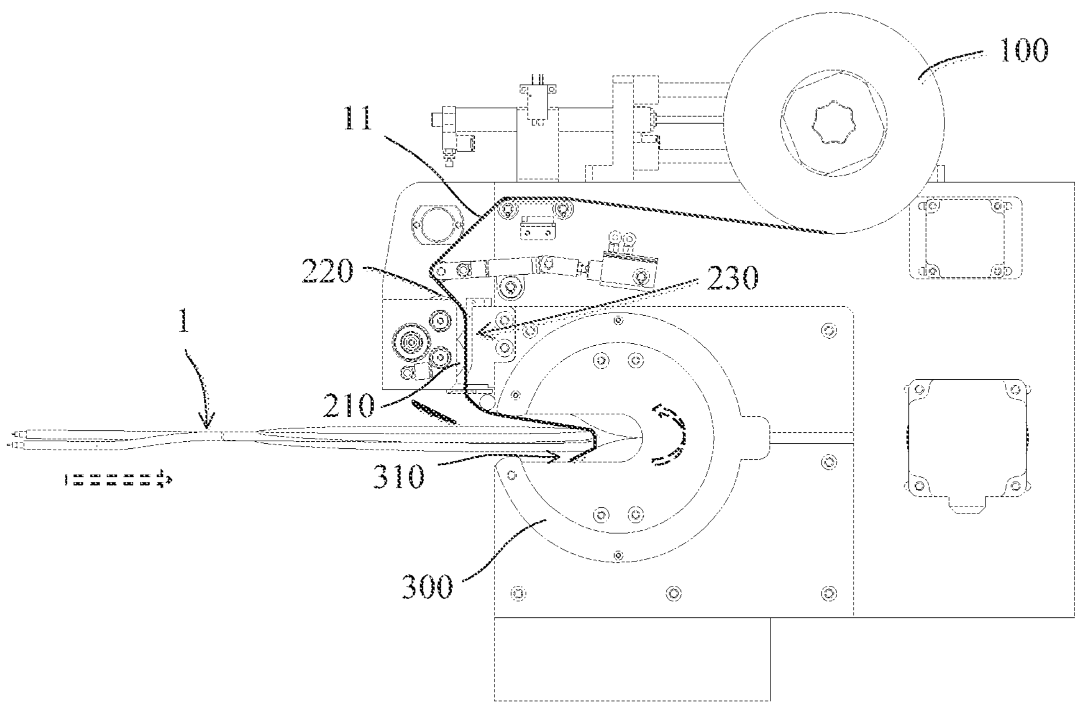
FIG. 3 is a side schematic view of a tape wrapping device according to an exemplary embodiment of the present disclosure, wherein a product on which the tape is to be wound is shown.
Figure 4A:
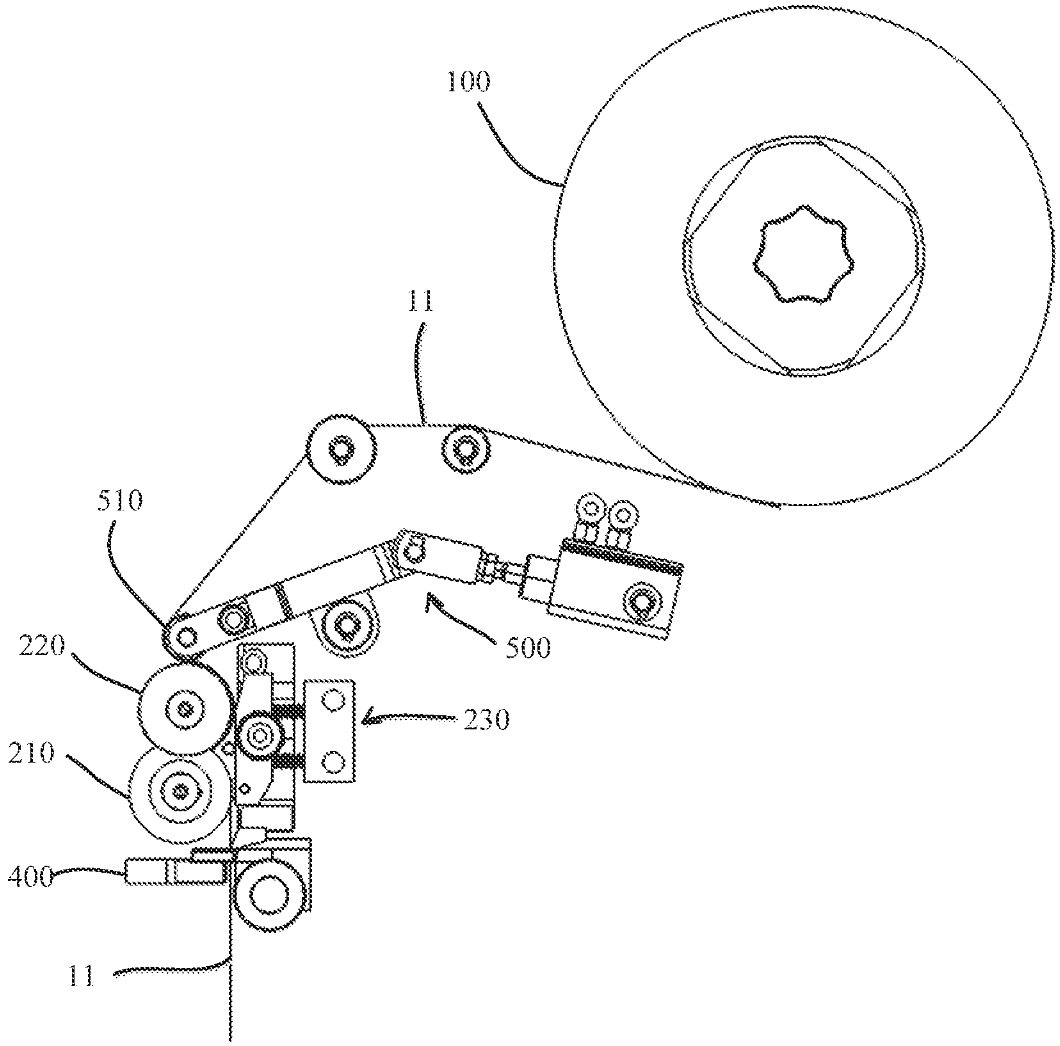
FIG. 4A is a side view schematic view of a tape conveying mechanism of a tape wrapping device according to an exemplary embodiment of the present disclosure.
Figure 4B:
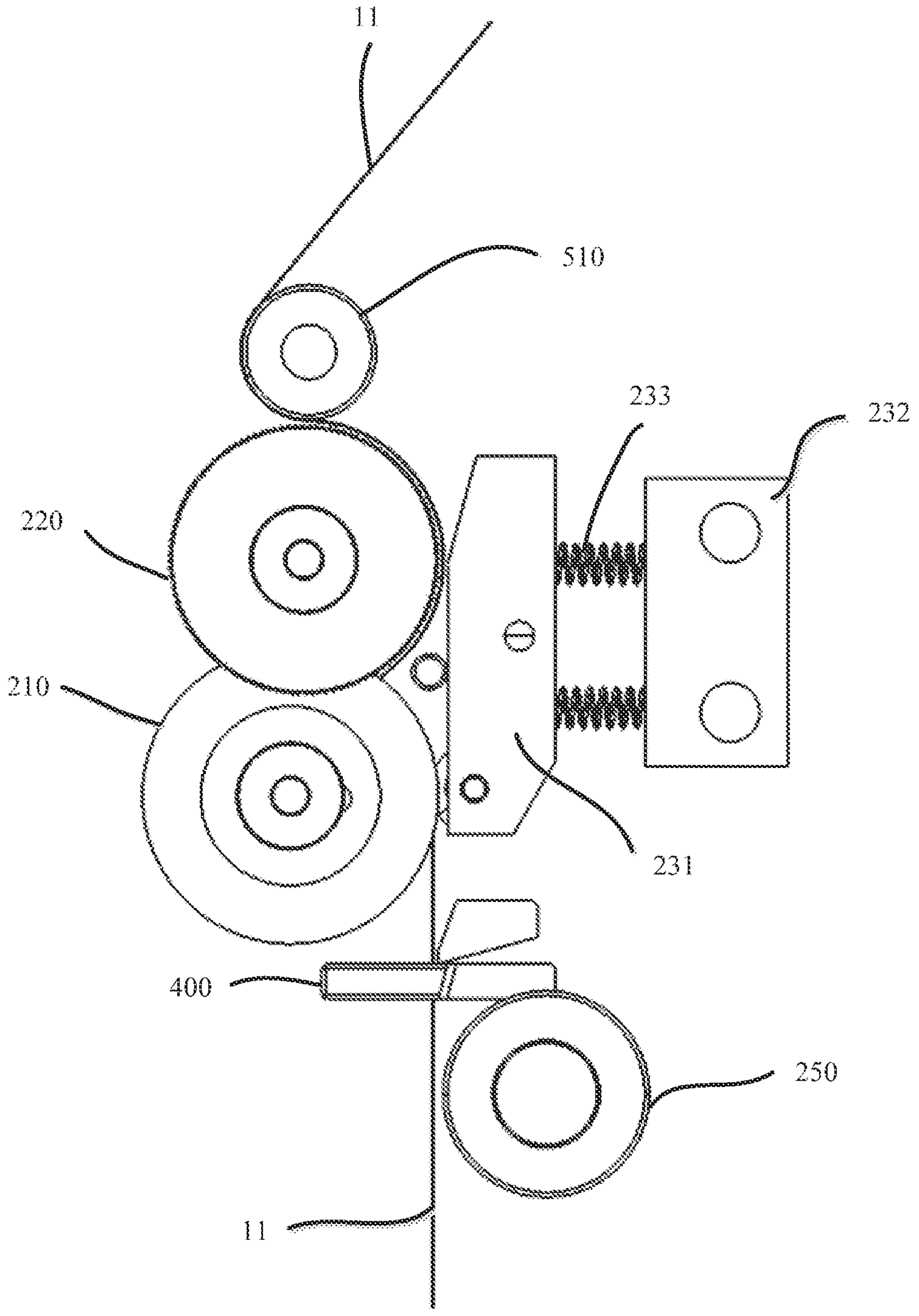
FIG. 4B is an enlarged side schematic view of a configuration of a part of the tape conveying mechanism of the tape wrapping device according to an exemplary embodiment of the present disclosure.
Figure 4C:
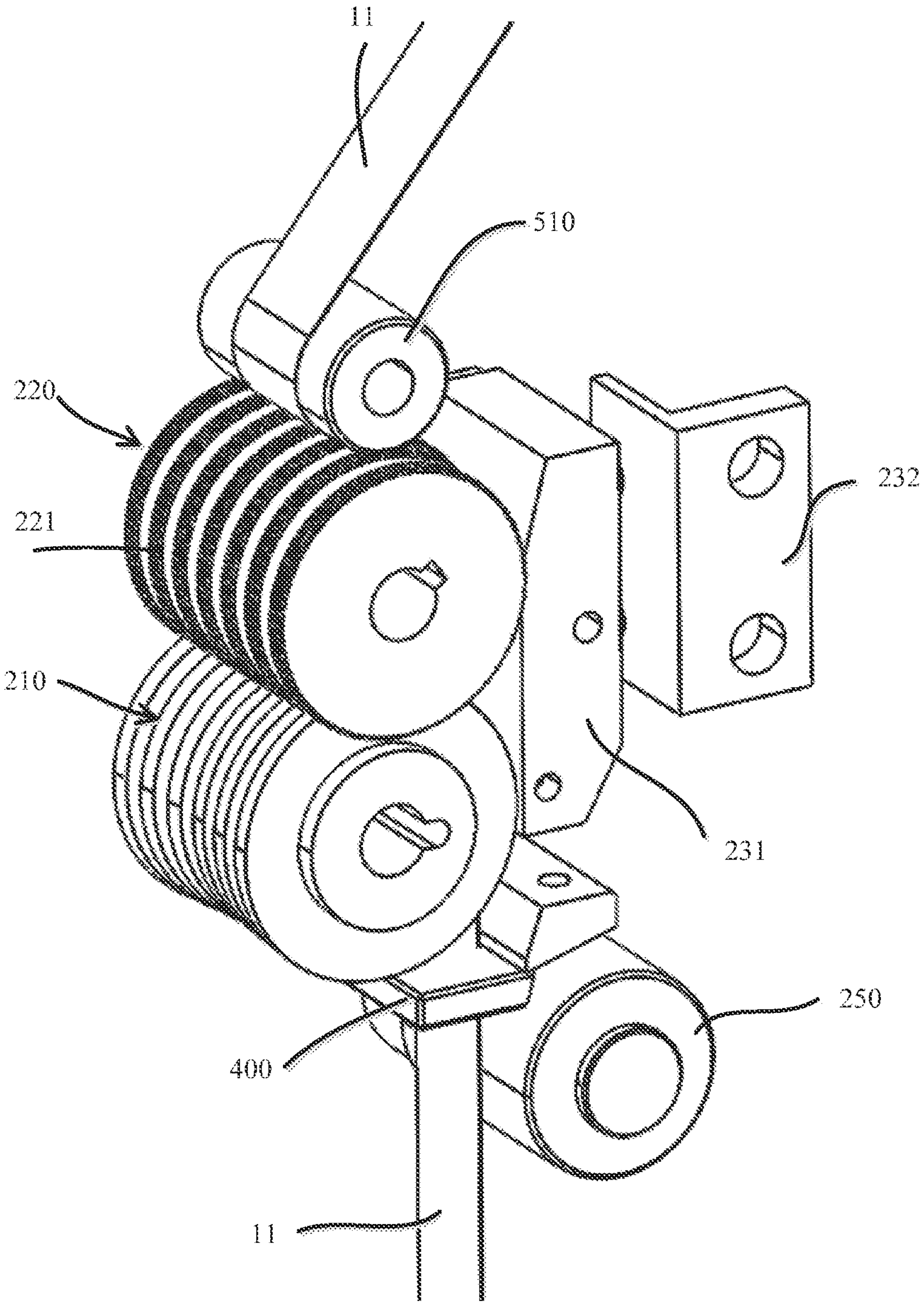
FIG. 4C is a partially enlarged perspective view of the configuration of a part of the tape conveying mechanism of the tape wrapping device according to an exemplary embodiment of the present disclosure.

As shown in FIGS. 1-3, the binding mechanism 300 is arranged downstream of the tape conveying mechanism 200 along the tape conveying direction, and has an accommodation space 310 for partially accommodating the product 1. The opening 311 of the accommodation space 310 leads to the standby position P. As an example, during operation, as shown in FIG. 3, first, the tape 11 is transported to the standby position P, for example, in the path through which the product 1 enters the accommodation space 310. The product 1 (such as coiled wire or cable) is then pushed to partially enter the accommodation space 310 through the opening 311. In this process, the adhesive tape 11 transported to the standby position P to be used is adhered or bonded to the product 1. Next, the binding mechanism 300 rotates, but the product 1 does not rotate. The binding mechanism 300 contacts and drives the tape 11 to rotate to wrap the tape 11 on the product 1.

As shown in FIGS. 1 and 4A-4C, the tape wrapping device 10 may also include a cutting mechanism 400 arranged downstream of the tape conveying mechanism 200 and upstream of the binding mechanism 300 along the tape conveying direction. After the binding mechanism 300 has wrapped the tape 11 on the product 1, the tape 11 is cut at the position between the tape conveying mechanism 200 and the binding mechanism 300. A guide roller 250 may be provided downstream of the cutting mechanism 400, which can guide the tape 11 leaving the tape conveying mechanism 200 or a first conveying drum 210 of it to be properly positioned to the standby position P, such as close to the opening 311 of the accommodation space 310. The guide roller 250 further guides and supports the tape 11 as it is moved towards the accommodation space 310 during winding the tape.

The tape conveying mechanism 200 includes a first conveying drum 210 positioned upstream of the waiting position P along the tape conveying direction, for example, upstream of the cutting mechanism 400. The first conveying drum 210 may be oriented so that its axial direction intersects (e.g., orthogonal to) the tape conveying direction, for example, its axial direction is roughly parallel or consistent with the width direction of the tape 11 being conveyed. In operation, the outer peripheral surface of the first conveying drum 210 contacts the adhesive surface or back surface of the tape 11 to convey the tape 11 to the standby position P.

The first conveying drum 210 may be driven to rotate by a driving mechanism to convey the tape 11. As an example, as shown in FIGS. 1-2, the driving mechanism is installed on the seat frame 101, for example, and may include a motor 241, a roller 242 driven by the motor 241, rollers 244 and 245 driven by the roller 242 via a driving belt 243, and a roller 246. The roller 246 is engaged with the first conveying roller 210 and driven by the roller 245 to drive the first conveying drum 210 to rotate. Alternatively, the first conveying drum may be driven to rotate directly by a motor or via other forms of intermediate mechanisms.

Figure 5A:
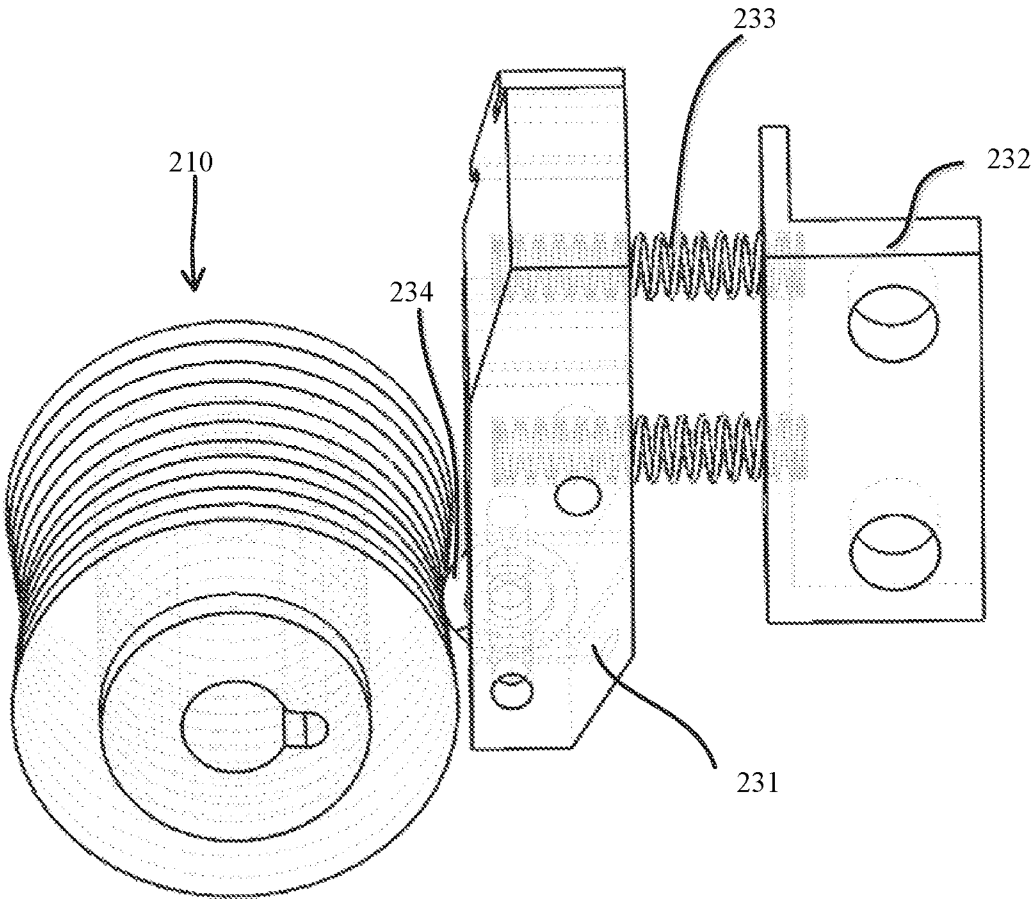
FIG. 5A is a partially enlarged perspective view of the configuration of a first conveying drum and a pressing assembly of a tape conveying mechanism of a tape wrapping device according to an exemplary embodiment of the present disclosure.
Figure 5B:
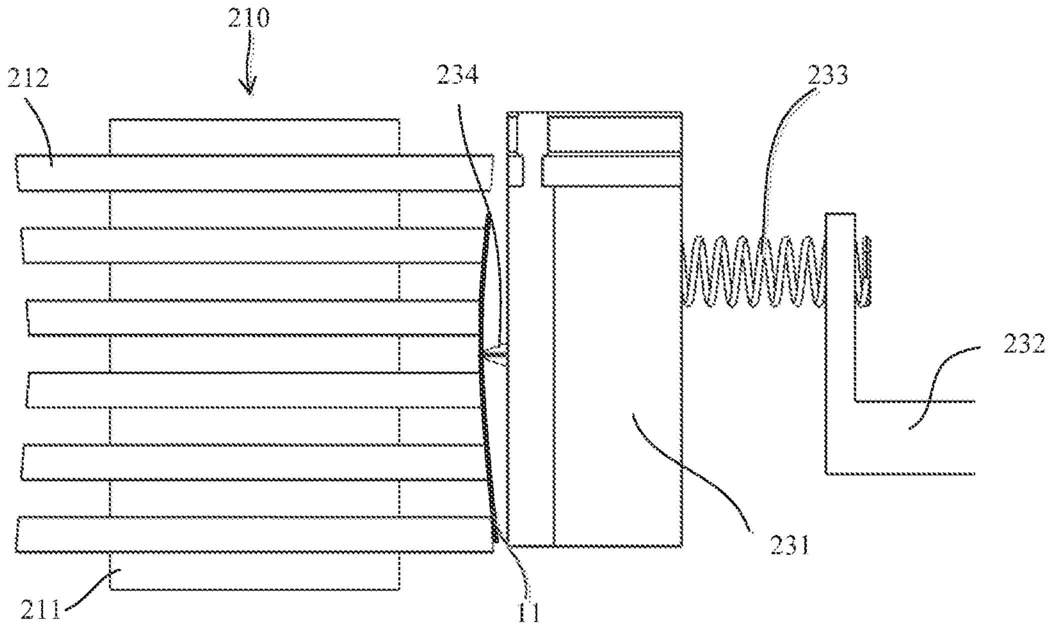
FIG. 5B is a partially enlarged side view of the configuration of the first conveying drum and the pressing assembly of the tape conveying mechanism of the tape wrapping device according to an exemplary embodiment of the present disclosure.
Figure 5C:
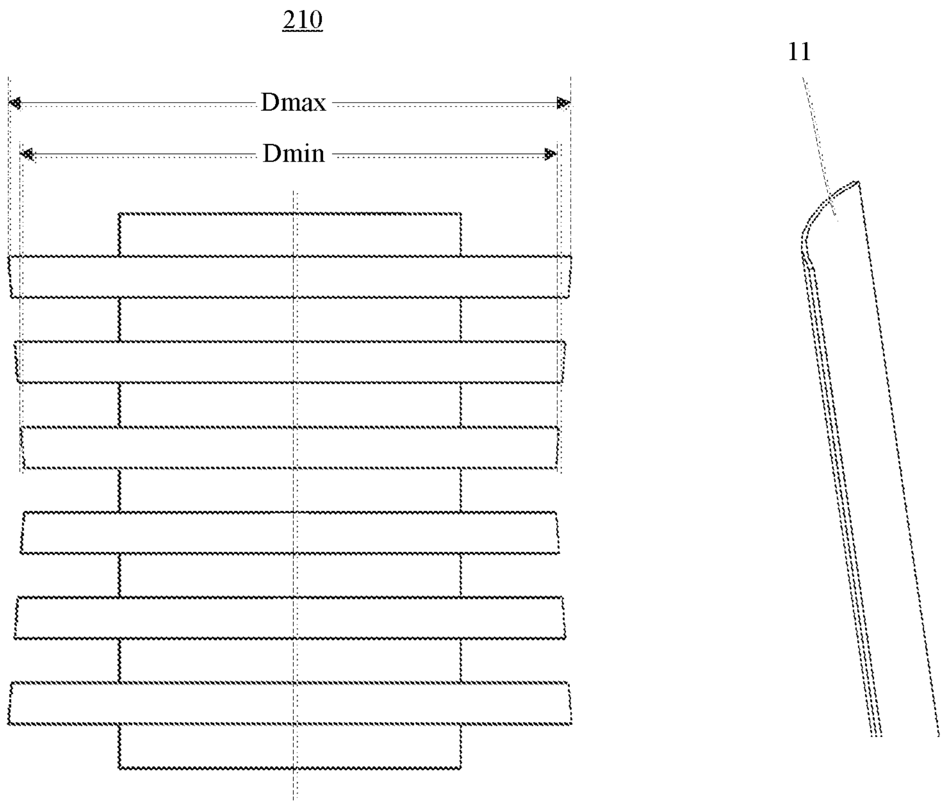
FIG. 5C is a cross-sectional view of the structure of the first conveying drum of the tape conveying mechanism of the tape wrapping device according to an exemplary embodiment of the present disclosure.

In the exemplary embodiment of the present disclosure, the outer contour defining the outer peripheral surface of the first conveying drum 210 has a variable outer diameter along an axial direction of the conveying drum 210. This shape promotes the tape 11 to change its shape or contour when in contact with the outer peripheral surface of the first conveying drum 210, such as from a flat tape to a curved tape, so that the tape leaving the first conveying drum 210 presents a curved contour in its width direction, such as an arched contour, as shown in FIG. 5C. Thus, the tape 11 with curved profile is easy to be separated from the first conveying drum or other parts of the tape conveying mechanism (such as the following pressing components). In this way, there will be no blockage caused by the adhesive tape 11 adhering to the drum or components, and there is no need for lubrication, so as to reduce pollution.

In some embodiments, the first conveying drum 210 conveys the tape 11 to the standby position P in such a way that its outer peripheral surface contacts the adhesive surface of the tape 11 so that the adhesive surface of the tape 11 leaving the first conveying drum 210 faces the product 1 to be pushed into the accommodation space 310 of the binding mechanism 300. As described below, in other embodiments, the first conveying drum may convey the tape in such a way that its outer peripheral surface is in contact with the back surface of the tape.

The first conveying drum 210 has a middle part and two opposite ends along its axial direction. The outer diameter of the first conveying drum 210 at the middle part is different from that at the opposite two ends, so that at least a part of the outer peripheral surface of the first conveying drum or the surface in contact with the tape presents a curved profile. As an example, as shown in FIGS. 5A-5C, the outer diameter of the first conveying drum 210 gradually increases from its middle part to two opposite ends. For example, it has a minimum outer diameter Dmin at the axial middle part and a maximum outer diameter Dmax at the axial end, so that the first conveying drum 210 presents a contour of thin middle and thick ends as a whole in the axial direction. In other examples, the outer peripheral surface of the first conveying drum may be in contact with the back surface of the tape. In this case, its outer diameter gradually decreases from its middle part to the opposite two ends. For example, it has the maximum outer diameter at the axial middle part and the minimum outer diameter at the axial end, so that the first conveying drum presents a contour of thick middle and thin ends in the axial direction.

The first conveying drum 210 may be provided with a protrusion structure to reduce the contact area between the first conveying drum and the tape, and it is more convenient for the tape to be separated from the first conveying drum. In some examples, as shown in FIGS. 4C-5C, the first conveying drum 210 includes a first cylindrical body 211 and a plurality of first ribs 212 protruding outward from the first cylindrical body 211, the adjacent ribs 212 are separated from each other, and the outer surface of the ribs 212 contacts the tape 11 during conveying the tape, thereby reducing the contact area between the first conveying drum 210 and the tape 11. Each of the first ribs 212 may extend in a circumferential direction or an axial direction of the first cylindrical body 211. The first rib at least partially defines the curved outer peripheral surface or outer contour of the first conveying drum. For example, the outer diameter of the first rib at the axial middle part of the first conveying drum is different from, such as less than or greater than the outer diameter of the first rib at the axial end of the first conveying drum. The protrusion structure arranged on the first conveying drum is not limited to the form of ribs, but can also adopt a variety of other forms of protrusions, such as scattered convex points, sawtooth structure, etc., or even a plurality of recesses or grooves may be arranged on the outer peripheral surface of the first conveying drum, which can also reduce the contact area between the first conveying drum and the tape.

In the illustrated embodiment, the tape conveying mechanism 210 also includes a pressing assembly 230, which is installed on the base frame 101 opposite to the first conveying drum 210 to form a gap defining a tape conveying path between the pressing assembly 230 and the first conveying drum 210. The pressing assembly 230 is used to press the tape 11 against the outer peripheral surface of the first conveying drum 210 when the tape conveying mechanism 210 conveys the tape 11 along the tape conveying path. In some examples, the gap or spacing between the pressing assembly and the first conveying drum may be adjusted to accommodate different thicknesses of tape or to provide suitable pressing force for the tape.

In some embodiments, as shown in FIGS. 3-5B, the pressing assembly 230 includes a pressing plate 231, a fixed member 232 mounted on the base frame 101, and a bias member 233 arranged between the pressing plate 231 and the fixed member 232, which is used to bias the pressing plate 231 towards the first conveying drum 210. The pressing plate 210 presses the tape 11 passing through the gap between the pressing assembly and the first conveying drum against the outer peripheral surface of the first conveying drum 210. As an example, the bias member 233 may include a spring.

In the embodiment shown in FIGS. 3-5B, the pressing assembly 230 may also include a pressing member 234 arranged on a side of the pressing plate 233 facing the first conveying drum 210. The pressing member 234 includes a part which is provided closer to the first conveying drum 210 than a pressing surface of the pressing plate 233 facing the first conveying drum 210, that is, the part protrudes from the pressing surface of the pressing plate 233 facing the first conveying drum 210. The pressing member 234 presses the tape 11 against the outer peripheral surface of the first conveying drum 210 through this part to cause the tape 11 to change into a curved shape or contour.

As an example, the pressing member 234 is positioned relative to the middle part of the first conveying drum 210 in its axial direction so that the spacing between the pressing member 234 and the outer peripheral surface of the first conveying drum 210 is less than the spacing between the pressing surface of the pressing plate 233 and the outer peripheral surface of the first conveying drum 210.

For example, the pressing member 234 may include a pressing wheel rotatably arranged on the pressing plate 233 so that the outer peripheral surface of the pressing wheel presses the tape 11 against the outer peripheral surface of the first conveying drum 210. Alternatively or additionally, the pressing member may also include a convex structure formed on the pressing surface of the pressing plate.

In other embodiments, during conveying the tape, the first conveying drum contacts the back surface of the tape, and the pressing plate and/or the pressing member contacts the adhesive surface of the tape. In an alternative example, the pressing plate may include a concave pressing surface in the middle, and the first conveying drum includes a convex middle part to cause the tape to change into a curved shape or contour to facilitate separation of the tape from the conveying mechanism.

In the embodiment shown in FIGS. 1-4C, the tape conveying mechanism 200 also includes a second conveying drum 220, which is positioned upstream of the first conveying drum 210 along the tape conveying direction. During conveying the tape, the outer peripheral surface of the second conveying drum 220 may contact the tape 11 and convey the tape 11 to the first conveying drum 210. The second conveying drum 220 is also positioned relative to the pressing assembly 230 to define a part of the tape conveying path.

Figure 6:
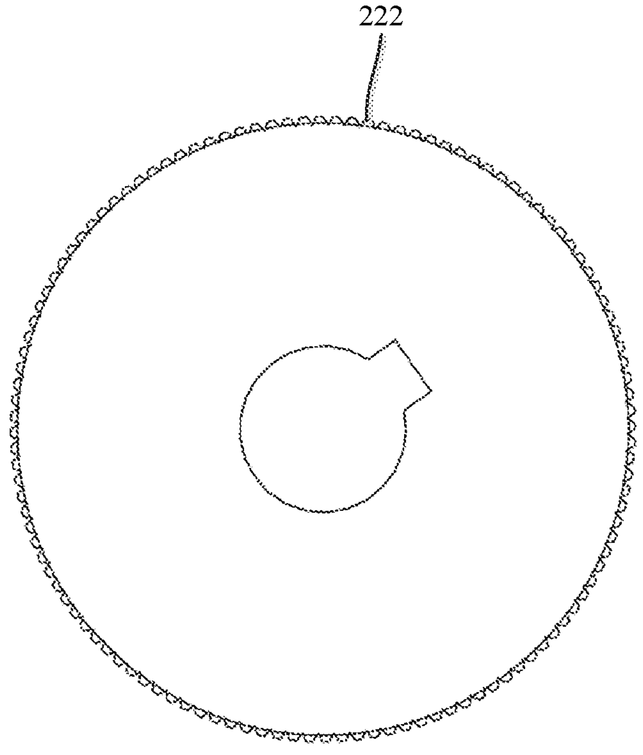
FIG. 6 is a sectional view of the structure of the second conveying drum of the tape conveying mechanism of the tape wrapping device according to an exemplary embodiment of the present disclosure.

The second conveying drum 220 may also be provided with some structures for contacting with the tape, such as a plurality of convex structures protruding outward and spaced from each other, and/or recesses and grooves formed on the outer peripheral surface of the second conveying drum, that is, the second conveying drum 220 has an uneven, serrated outer surface. During conveying the tape, these structures are in contact with the tape, thereby reducing the contact area between the second conveying drum and the tape. For example, the convex structure may include a second rib or sawtooth structure 221 extending along the circumferential or axial direction of the second conveying drum (see FIG. 4C), and/or scattered convex points 222 (see FIG. 6). In some embodiments, similar to the first conveying drum, the second conveying drum may have an outer peripheral surface or outer contour with a varying outer diameter. For example, in the axial direction, the whole presents the contour of thin in the middle and thick at both ends, or presents the contour of thick in the middle and thin at both ends.

In addition, as shown in FIGS. 1-4C, the tape wrapping device 10 may also include a pushing mechanism 500 for reliably pressing the tape from the tape reel 100 against the second conveying drum 220, so as to facilitate further movement of the tape 11 leaving the tape reel 100 by tensioning and pulling through the rotation of the second conveying drum 220. For example, the pushing mechanism 500 may include a pushing roller 510 positioned upstream of the second conveying drum 220, which pushes the tape 11 towards the second conveying drum 220 under the push of the driving device.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A tape wrapping device adapted to wind a tape with an adhesive surface and a back surface on a product, comprising:

a frame;

a tape conveying mechanism mounted on the frame and conveying the tape to a standby position, the tape conveying mechanism including:

a first conveying drum positioned upstream of the standby position along a conveying direction of the tape and driven to rotate by a driving mechanism, an outer contour of the first conveying drum defining an outer peripheral surface having a variable outer diameter along an axial direction of the first conveying drum and conveying the tape towards the standby position when its outer peripheral surface is in contact with one of the adhesive surface or the back surface of the tape, such that the tape leaving the first conveying drum presents a curved contour in its width direction;

a pressing assembly mounted on the frame opposite the first conveying drum and forming a gap defining a tape conveying path between the pressing assembly and the first conveying drum, the pressing assembly including a pressing plate having a planar pressing surface pressing the tape against the outer peripheral surface of the first conveying drum when the tape conveying mechanism conveys the tape along the tape conveying path; and a second conveying drum, the second conveying drum positioned upstream of the first conveying drum along the conveying direction of the tape to convey the tape to the first conveying drum when an outer peripheral surface of the second conveying drum is in contact with the tape, the second conveying drum including a plurality of convex structures spaced from each other and contacting the tape as it is conveyed; and a binding mechanism wrapping the tape on the product when the product is applied to the tape at the standby position.

2. The tape wrapping device according to claim 1, wherein the pressing assembly further includes:

a fixed member mounted on the frame; and a bias member provided between the pressing plate and the fixed member, the bias member biasing the pressing plate towards the first conveying drum such that the pressing plate presses the tape passing through the gap against the outer peripheral surface of the first conveying drum and in a direction toward the second conveying drum.

3. The tape wrapping device according to claim 2, wherein the pressing assembly further comprises a pressing member arranged on a side of the pressing plate facing the first conveying drum, the pressing member including a portion arranged closer to the first conveying drum than the pressing surface of the pressing plate facing the first conveying drum, the portion of the pressing member pressing the tape against the outer peripheral surface of the first conveying drum.

4. The tape wrapping device according to claim 3, wherein the pressing member is positioned relative to a middle part of the first conveying drum along its axial direction, and a spacing between the pressing member and the outer peripheral surface of the first conveying drum is less than a spacing between the pressing surface of the pressing plate and the outer peripheral surface of the first conveying drum.

5. The tape wrapping device according to claim 3, wherein the pressing member comprises a pressing wheel rotatably arranged on the pressing plate, the outer peripheral surface of the pressing wheel pressing the tape against the outer peripheral surface of the first conveying drum.

6. The tape wrapping device according to claim 2, wherein the biasing member comprises a spring.

7. The tape wrapping device according to claim 1, wherein the first conveying drum has a middle part along its axial direction and two opposite ends, and an outer diameter of the first conveying drum at the middle part is distinct from an outer diameter of the first conveying drum at the two opposite ends.

8. The tape wrapping device according to claim 7, wherein the outer diameter of the first conveying drum gradually increases from its middle part to the opposite two ends.

9. The tape wrapping device according to claim 1, wherein the first conveying drum includes a first cylindrical body and a plurality of first ribs projecting outward from the first cylindrical body, the plurality of first ribs including a plurality of inner ribs arranged between respective ones of two end ribs, wherein adjacent ones of the plurality of first ribs are separated from one another in an axial direction.

10. The tape wrapping device according to claim 9, wherein each first rib extends along a circumferential direction of the first cylindrical body, and is adapted such that the tape contacts an outermost radial surface thereof.

11. The tape wrapping device according to claim 1, wherein the first conveying drum conveys the tape towards the standby position with its outer peripheral surface contacting the adhesive surface of the tape such that the adhesive surface of the tape leaving the first conveying drum faces the product.

12. The tape wrapping device according to claim 1, wherein the gap between the pressing assembly and the first conveying drum is adjustable to adapt different thicknesses of tapes.

13. The tape wrapping device according to claim 1, wherein the convex structures include a second rib extending along a circumferential direction or an axial direction of the second conveying drum, and/or a plurality of convex points arranged dispersedly.

14. The tape wrapping device according to claim 1, wherein the pressing plate presses the tape against the outer peripheral surfaces of the first conveying drum and the second conveying drum when the tape conveying mechanism conveys the tape along the tape conveying path.

15. The tape wrapping device according to claim 1, wherein the pressing surface of the pressing plate is elastically biased in a direction toward the first conveying drum and the second conveying drum when the tape conveying mechanism conveys the tape along the tape conveying path.

16. A tape wrapping device, comprising:

a tape conveying mechanism adapted to convey a tape to a standby position and including;

a first conveying drum positioned upstream of the standby position along a conveying direction of the tape and driven to rotate by a driving mechanism, an outer contour of the drum defining an outer peripheral surface having a variable outer diameter along an axial direction;

a pressing assembly mounted opposite the first conveying drum and forming a gap defining a tape conveying path between the pressing assembly and the first conveying drum, the pressing assembly including a pressing plate having a planar pressing surface pressing the tape against the outer peripheral surface of the first conveying drum when the tape conveying mechanism conveys the tape along the tape conveying path; and a second conveying drum positioned upstream of the first conveying drum along the conveying direction of the tape to convey the tape to the first conveying drum when an outer peripheral surface of the second conveying drum is in contact with the tape, the second conveying drum including a plurality of convex structures spaced from each other and contacting the tape as it is conveyed; and a binding mechanism wrapping the tape on a product when the product is bonded to the tape at the standby position.

17. The tape wrapping device according to claim 16, wherein the first conveying drum has a middle part along its axial direction and two opposite ends, and an outer diameter of the middle part is distinct from an outer diameter of the first conveying drum at the two opposite ends.

18. The tape wrapping device according to claim 17, wherein the outer diameter of the first conveying drum gradually increases from the middle part to the opposite two ends.

19. The tape wrapping device according to claim 16, wherein the first conveying drum includes a first cylindrical body and a plurality of first ribs projecting outward from the first cylindrical body, the plurality of first ribs including a plurality of inner ribs arranged between respective ones of two end ribs, wherein adjacent ones of the plurality of first ribs are separated from one another in an axial direction.

20. A tape wrapping device adapted to wind a tape with an adhesive surface and a back surface on a product, comprising:

a frame;

a tape conveying mechanism mounted on the frame and conveying the tape to a standby position, the tape conveying mechanism including;

a first conveying drum positioned upstream of the standby position along a conveying direction of the tape and driven to rotate by a driving mechanism, an outer contour of the first conveying drum defining an outer peripheral surface having a variable outer diameter along an axial direction of the first conveying drum and conveying the tape towards the standby position when its outer peripheral surface is in contact with one of the adhesive surface or the back surface of the tape, such that the tape leaving the first conveying drum presents a curved contour in its width direction;

a pressing assembly mounted on the frame opposite the first conveying drum and forming a gap defining a tape conveying path between the pressing assembly and the first conveying drum, the pressing assembly including a pressing plate having a planar pressing surface pressing the tape against the outer peripheral surface of the first conveying drum when the tape conveying mechanism conveys the tape along the tape conveying path;

a second conveying drum, the second conveying drum positioned upstream of the first conveying drum along the conveying direction of the tape to convey the tape to the first conveying drum when an outer peripheral surface of the second conveying drum is in contact with the tape, the tape conveying path arranged between the second conveying drum and the pressing assembly; and a pushing mechanism including a pushing roller pressing the tape against the second conveying drum; and a binding mechanism wrapping the tape on the product when the product is applied to the tape at the standby position.

* * * * *